(12) United States Patent
Stoiber

(10) Patent No.: US 6,744,155 B1
(45) Date of Patent: Jun. 1, 2004

(54) MOMENTUM-DECOUPLED DIRECT DRIVE

(75) Inventor: Dietmar Stoiber, Grünwald (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 09/646,379

(22) PCT Filed: Mar. 8, 1999

(86) PCT No.: PCT/EP99/01482
§ 371 (c)(1),
(2), (4) Date: Sep. 13, 2000

(87) PCT Pub. No.: WO99/48191
PCT Pub. Date: Sep. 23, 1999

(30) Foreign Application Priority Data

Mar. 13, 1999 (DE) .......................... 198 10 996

(51) Int. Cl.⁷ .......................... H02K 41/02; B23Q 5/28
(52) U.S. Cl. .......................... 310/15; 310/17; 388/937; 29/39; 29/27 C
(58) Field of Search .......................... 310/90.5, 12, 13, 310/14, 15–24, 25–35; 388/937; 29/39, 27 C (56) References Cited

U.S. PATENT DOCUMENTS

| | | | | | |
|---|---|---|---|---|---|
| 3,857,075 A | * | 12/1974 | Sawyer | .......................... | 310/12 |
| 4,075,517 A | * | 2/1978 | Adler | .......................... | 310/13 |
| 4,356,772 A | * | 11/1982 | van der Heide | .......................... | 310/12 |
| 4,890,023 A | * | 12/1989 | Hinds et al. | .......................... | 310/12 |
| 4,945,269 A | * | 7/1990 | Kamm | .......................... | 310/15 |
| 5,062,012 A | * | 10/1991 | Maeda et al. | .......................... | 318/135 |
| 5,099,158 A | * | 3/1992 | Stuart et al. | .......................... | 310/14 |
| 5,277,744 A | * | 1/1994 | Snyder | .......................... | 310/15 |
| 5,497,038 A | * | 3/1996 | Sink | .......................... | 310/12 |
| 5,504,407 A | * | 4/1996 | Wakui et al. | .......................... | 318/568.17 |
| 5,994,854 A | * | 11/1999 | Lawrenson et al. | .......................... | 318/114 |

FOREIGN PATENT DOCUMENTS

| | | |
|---|---|---|
| DE | 23 54 947 | 5/1975 |
| DE | 4445283 A1 * | 6/1996 |
| DE | 297 18 566 U1 | 1/1998 |
| EP | 0 720 889 A | 7/1996 |
| JP | OS-(GM)05-15655 | 2/1993 |
| JP | 10-52023 | 2/1998 |

OTHER PUBLICATIONS

Production Engineering: Research and Development in Germany, vol. 2, 1996, pp. 57–60, XP002108504, A Fast-Tool–Servo System based on electrodynamic and piezoelectric Actuators.

* cited by examiner

Primary Examiner—Burton S. Mullins
Assistant Examiner—J. Aguirrechea
(74) Attorney, Agent, or Firm—Henry M. Feiereisen (57) ABSTRACT

A motor for driving a load, such as a tool or a workpiece, can be installed in a machine, for example an eccentric lathe. The motor has an output-drive section associated with the useful load, a reaction section which interacts with the drive section, and a base that rigidly supports the motor in the machine. The reaction section of conventional motors is typically rigidly attached to the machine, so that vibration can be introduced in the machine bed if a strong force is transmitted to or received from the load. According to the invention, these vibrations can be reduced or eliminated by mounting the reaction section on the base in such a way that any movement by the output-drive section can be compensated by a corresponding opposing movement of the reaction section. The inertia of the reaction section hence compensates the corresponding opposing forces in the event of sudden or strong acceleration of the load.

21 Claims, 6 Drawing Sheets

MOMENTUM-DECOUPLED DIRECT DRIVE

BACKGROUND OF THE INVENTION

The present invention relates to a motor, in particular a linear motor for a machine tool or a pump, wherein the movement of the motor can be controlled without requiring correction of the movement of a reaction section.

Workpieces or tools are moved in many machines in industrial production processes, with the movement taking place along fixed, predetermined axis tracks. The rate at which the machine operates depends essentially on the speed of the adjustment and transport movements. High axis speeds are thus desirable in order to achieve high machine productivities.

In most cases, the adjustment movements, which need to have a certain precision, are carried out by controlled electrical servo drives. In order to take account of the considerably more stringent requirements for accuracy and speed, direct drives have been increasingly used for many years for high-precision adjustment and transport movements. In direct drives, the feed or rotation force required for the movement is produced by a motor or a power converter and is introduced into the useful load without passing through any gearbox or mechanical transmissions. Appropriate servo motors and linear motors are available. The high accelerations and major jolts (rate of change of acceleration) which occur with rapid axis movements lead to vibration in the machine structures, and thus to negative influences on the processing results.

Like all motors, direct drives also have two mutually paired active surfaces, between which the drive force is built up as a consequence of the feed to the motor. The motor power or the motor torque is essentially proportional to the magnitude of the feed, or is linearized by suitable electronic distortion compensation. The feed side of the motor is referred to as the "active side". As an example, a linear motor will be considered here, whose active section is also called the "primary section". Both arrangements in which the active section is connected to the useful load and arrangements in which the passive section drives the useful load are in widespread use. That motor section which faces the useful load is referred to as the "output-drive side" of the motor. The side of the motor facing away from the useful load is referred to as the reaction side in the following text.

In order to transport the useful load as precisely as possible to the predetermined set positions, the actual position is detected by means of a position measurement system, and is supplied to a control unit. The position errors are evaluated here, and a calculated motor power is applied in order to accelerate the useful load so that the undesirable position error is reduced again. This process is referred to as control.

DE 23 54 947 discloses a linear motor which is based on vibration-damping bell elements and which is used in areas in which there is no requirement for high movement precision, for example for hoists, crane carriages, etc. This bearing ensures that the motor starts "smoothly".

However, in machine construction, it is assumed that drive units which are intended to carry out precise and rapid movements need to make contact with their reference masses in as fixed (rigid) a manner as possible. It is therefore always desirable to couple the motor output-drive side to the useful load in as fixed a manner as possible and to couple the motor reaction side to the base in as hard a manner as possible. In order to achieve this, DE 297 18 566, for example, provides for the motor reaction side to be coupled to the base via a material providing a high level of vibration damping (considerably greater than that of steel). It is likewise of critical importance to connect the position sensors, which are part of the control system described above, to the reference bodies in as fixed a manner as possible, and with as little vibration as possible.

During dynamic movement processes, the predetermined route curves produce high momentum changes, which must be transmitted through the direct drive to the useful load. Since the momentum is maintained, the motor reaction side has to absorb the opposing momentum. This momentum is introduced directly into the base, owing to the hard connection. This leads to severe vibration of the machine reference body, for example the machine bed, which may have disadvantageous effects on the accuracies and surface quality of the processing.

The article "A Fast-Tool-Servo System based on electrodynamic and piezoelectric Actuators" (Annals of the German Academic Society for Production Engineering 2 (1996), no. 2 and CIRP Annals. Manufacturing technology 1 (1995)) proposes that the drive system in a processing machine be softly coupled to the base. However, the relative reference between the output-drive section and the reaction section is measured by the measurement system, by means of a linear tacho. The result of the measurement is then supplied to the control unit. This allows the control system to have direct access to the relative movement between the output-drive section (useful mass or tool) and the base, since the movement of the reaction section is superimposed on the movement of the output-drive section, relative to the fixed base. The movement of the reaction section must therefore be corrected numerically in the position data, for which reason the soft coupling of the drive system to the base must have a behavior which is constant and can be defined in absolute terms. Even very minor discrepancies in the coupling parameters lead to major errors in the useful load movement.

SUMMARY OF THE INVENTION

The invention is based on the object of providing a motor of this generic type for machine tools or the like, which is designed such that it can be controlled in a simple manner, particularly without requiring any numerical correction for the movement of the reaction section.

According to one aspect of the invention, the drive motor for a machine tool includes an output-drive section associated with a load, a reaction section which interacts with the output-drive section, a base for attaching the drive motor to the machine tool, a bearing apparatus disposed between the reaction section and the base, with the reaction section mounted on the bearing apparatus such that the reaction section performs a movement that opposes movement of the output-drive section, and a position sensing device for deriving data for position control of the drive motor, wherein the position sensing device determines position data of the output-drive section relative to the base.

The invention is based on the surprising knowledge that precise tool movement control is possible despite the reaction section being decoupled from the base. The consistent use of the characteristics of a direct drive according to the invention, namely power conversion, allows an additional degree of freedom to be derived from this, which allows the predetermined drive momentum to be transmitted to the useful load without the base being loaded by the unavoidable opposing momentum. The present invention makes use of the characteristic that a power converter, such as a synchronous motor with permanent-magnet excitation, converts the feed variable—in this case the current—into a drive force proportional to this feed variable, directly and without any delay. In the case of power converters, such as the synchronous electric motor which is used as an example here, the drive force is dependent essentially only on the feed variable. It is significant that the present position of the motor active surfaces with respect to one another and, above all, their present speed with respect to one another, have no significant influence on the motor power. In high-quality power converters, the position-dependent and speed-dependent influences on the motor power are negligible.

The power converter thus always provides a drive force which is dependent exclusively on the feed variable used at that time, for example the current, but not on the speed or the position of the motor active surfaces. If a drive axis is set up according to the invention, in which the reaction side of the motor may move, the reaction side moves in the opposite direction, under the influence of the reaction momentum, when a nominal pulse is applied, to the useful load. The speed of the motor reaction side due to the opposing pulse is governed by the mass ratio of the two masses involved in the momentum transmission. The common center of gravity of the power converter system (with the masses coupled to it), in contrast, does not change speed. Owing to said lack of dependency of the motor power on the relative speed of the motor active surfaces, the actual momentum transmitted to the useful load is not influenced in any way by the opposing movement of the motor reaction side. The same position sensors and control strategies can thus be used in exactly the same way as the rigidly linked power converters in the known machines as well. In particular, the reference points of the shaft position sensor which, as is known, are of major importance for the quality of movement control, remain identical. The relative position between the moving useful load and the base, which is in a fixed position with respect to the axis movement direction, is thus measured in the same way.

Owing to the position measurement of the output-drive section with respect to the fixed-position base, the control system for the motor receives only data that do not include the movement of the reaction section. There is thus no need for numerical compensation for the movement of the reaction section with respect to the base. The control process is considerably simplified in this way. Since, furthermore, the reaction section is decoupled from the base and thus no longer transmits any momentum to it, positions can be determined considerably more accurately. Specifically, any momentum transmission to the base would lead to vibration of the base. Such vibration of the base would likewise be reflected in the position data, and would thus increase the fluctuation range of such data. This would in turn make position control more difficult. The motor according to the invention thus allows considerably much more accurate position control to be carried out than is possible with motors according to the prior art.

The only factor that need be remembered is that, in those power converters which use a multiphase feed, such as widely-used three-phase electric motors, the motor phase angle of the feed, must be related in a fixed way to the relative position (and, if necessary, to the relative speed as well) of the motor active surfaces. In the case of the synchronous motors used here by way of example, this process is called "commutation". In these power converters, the relative position of the motor active surfaces with respect to one another must be tapped off by means of a sensor, and supplied to the motor control system. It should be stressed in particular that the readjustment of the phase angle of the feed described here has nothing to do with the position control system of the power converter, but is used only to maintain the power converter constants.

If the machine is designed such that movement of the motors reaction side is permissible, then the intrinsic mass of this motor reaction side in fact absorbs the reaction, and the machine foundation is relieved from absorbing the reaction. This is particularly advantageous, for example, in the case of drives for adjusting the cutting tool of eccentric lathes, in which the cutting tool oscillates with extremely high accelerations and relatively small amplitudes in order to follow the eccentric contour of the workpiece as it rotates at high speed. In this case, the motor reaction side carries out an opposing oscillation, whose amplitude is likewise relatively small. The machine bed is not affected by shaking momentums, since these will have been dissipated in the opposing oscillation of the motor reaction side.

If the motor reaction side were suspended completely freely in the axis movement direction, its opposing movements could increase without any limitation. In particular, it is impossible to transmit forces which act in the same direction over a relatively long time. The cutting forces of processing processes, for example, could not be transmitted with completely free motor reaction side suspension. However, this problem can be overcome according to one preferred embodiments of the invention, if the motor reaction side is not suspended completely freely but is anchored to the base via an elastic member, for example a spring element. The mean deflection of the motor reaction side is then governed by the force balance between the constant element of the useful load force and the reaction force of the sprung restoring element. The magnitude of the mean deflection of the motor reaction side can thus be preset by the characteristic of the spring element.

When the motor reaction side is anchored by means of an elastic member, it is obvious that kinetic energy can be stored in the form of oscillations by the motor reaction side with respect to the base. A characteristic feature of an oscillating system is its resonant frequency. This is governed by the ratio of the spring temper to the oscillating mass. A particularly interesting fact in this case is that the mass of the driven useful load is not included in the mass that needs to be considered for the resonant frequency since, owing to its characteristics described above, the power converter cannot form any intrinsically stable restoring forces whatsoever between the two motor active surfaces. This behavior is desirable and leads to the useful load being perfectly decoupled from the oscillations of the motor reaction side.

If oscillation frequencies which are close to the natural resonant frequency described above are to be transmitted, it is possible for large oscillation amplitudes, which are typical of resonance phenomena, to occur. This is undesirable. According to a further preferred embodiment, this is corrected by a damper element which is connected in parallel with the spring element. This extracts the energy from the oscillation processes and thus effectively and predictably limits the oscillation amplitude on the motor reaction side. The resonant response can be tuned by means of the damping constant. An aperiodic resonant response has often been found to be particularly advantageous, since this avoids any amplitude peak at resonance.

In this case, the oscillating system behaves as a low-pass filter which, above its cut-off frequency (the resonant frequency), filters the corresponding frequency elements out of the spectrum of the reaction forces of the power converter, and keeps them away from the machine foundation. Magnetic dampers are particularly advantageous as damping elements, since they are free of static and sliding friction, since they operate without any contact.

Depending on their design, modern machines are known to be highly stable in response to disturbance frequencies up to 80 Hz, and excitation frequencies above this should be avoided. This must be remembered when choosing the cut-off frequency of the mechanical low-pass filter. If one remembers that the power amplitude is halved when the frequency is doubled in the damping region of the aperiodically tuned mechanical filter, then it is evident that changing the tuning of the cut-off frequency by values of 5 to 10 Hz is sufficient to achieve highly effective momentum decoupling in the sensitive range above said frequency of 80 Hz. Changing the tuning of the cut-off frequency is, of course, a compromise between the oscillation amplitudes on the motor reaction side, which one would like to permit, and the decoupling level with regard to the reaction impulses in the upper frequency band.

The momentum decoupling method, which will be referred to as a "Stoiber inertia drive", offers the machine design an additional degree of freedom, which allows the reaction momentums in direct drives to be effectively kept away from the machine structure, particularly at the higher frequencies, where they reduce accuracy.

In this case, the principle according to the invention is not limited to electric linear motors, but can also be applied to torque motors, fluid motors, etc. It is suitable for all machines in which oscillatory movements need to be provided, for example eccentric lathes and for milling machines, automatic drilling, bonding or component-placement machines, balancing machines, pumps or even loudspeakers.

BRIEF DESCRIPTION OF THE DRAWING

Embodiments of the invention will be explained with reference to the attached drawings, in which.

DETAILED DESCRIPTION OF PREFERRED EMBODIMENTS

Figure 1:
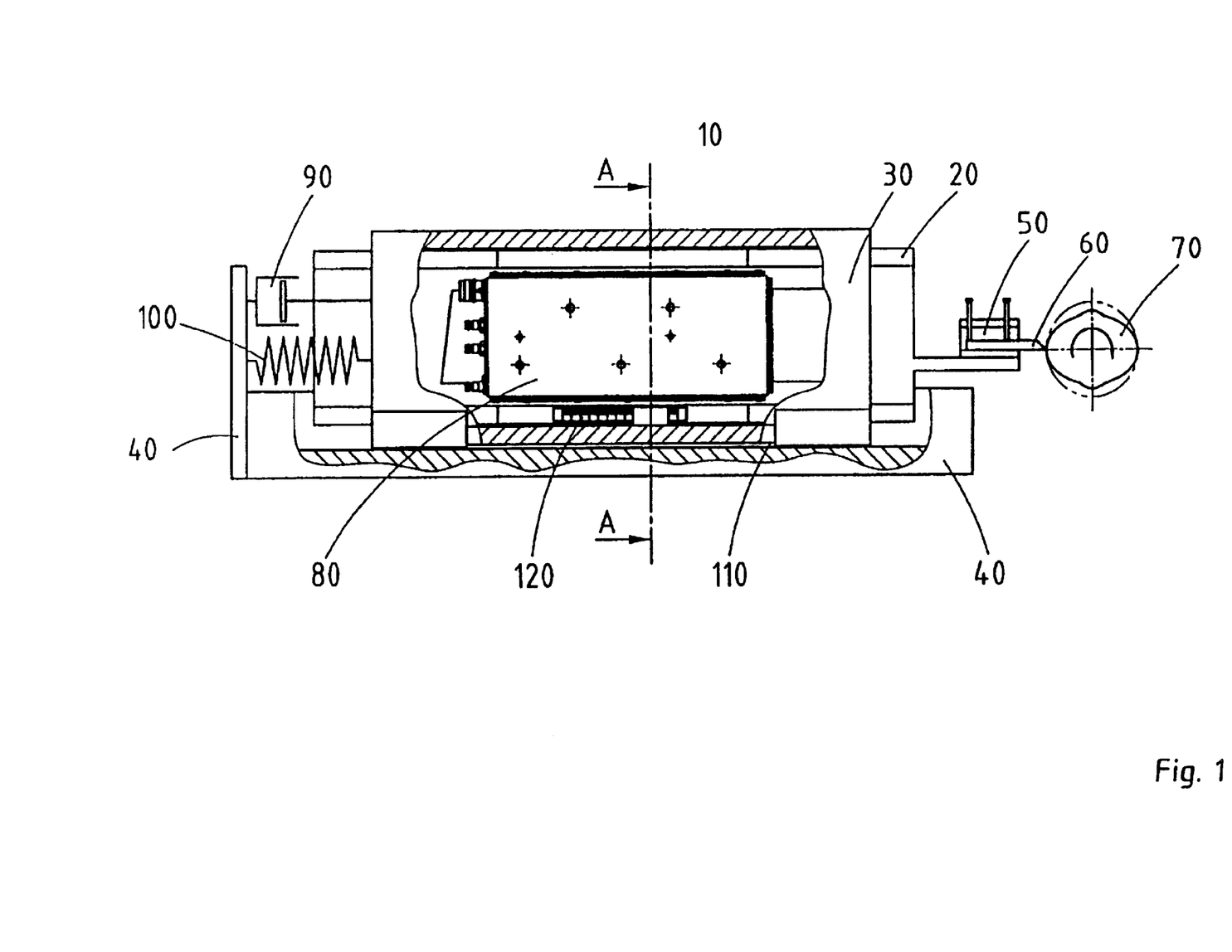
FIG. 1 shows a linear motor according to the invention, in a partially cutaway side view.

FIG. 1 shows a linear motor according to the invention for use, for example, in an eccentric lathe.

Figure 2:
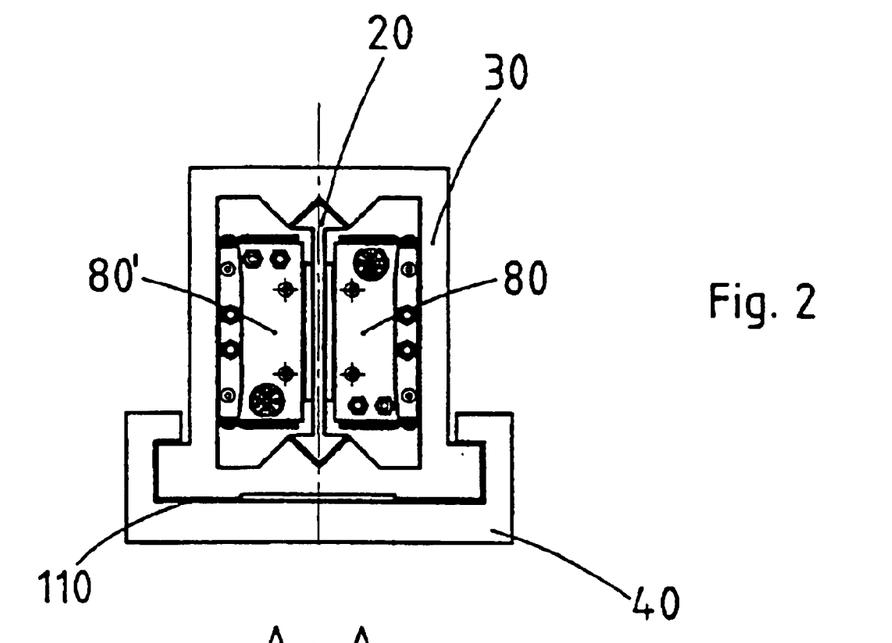
FIG. 2 shows a front view of the motor from FIG. 1.

The principle of construction of the linear motor is known per se and comprises an output-drive section 20 and a reaction section 30, with the reaction section 30 in the illustrated design being in the form of a primary section with windings 80, connections, etc. The views in FIGS. 2 and 3, in particular, show that the reaction section 30 has two identical winding sections 80, 80', between which the output-drive section 20, which in this case is the secondary section, is accommodated.

As can be seen from FIG. 1, a holder 50 for a tool 60 is formed on one side of the output-drive section 20, with the tool in the illustrated example being a turning tool for machining a workpiece 70. The motor 10 is driven appropriately to make the workpiece 70 eccentric, and position control is carried out, which is not illustrated in detail here because it is generally known.

In conventional linear motors, the reaction section 30 is rigidly connected to a base 40. In contrast, according to the invention, the reaction section 30 is not rigidly connected to the base 40, but is mounted on the base 40 such that the reaction section 30 can carry out a corresponding opposing movement, in the other direction, when the output-drive section 20 moves in one direction. The motor according to the invention has a hydrostatic bearing 110 for this purpose. Other types of bearings may also be used, for example roller bearings or else magnetic bearings, in which case, however, roller bearings may be less advantageous, for example in the case of eccentric lathes, owing to the small movements. The only important factor is that the reaction section is mounted such that it can move in the drive direction, that is to say in the direction in which the turning tool 60 moves, and is guided precisely in an advantageous manner transversely with respect to this drive direction.

In order to prevent the center of gravity of the motor moving away from the desired position, one end of the reaction element 30 is provided with a spring element 100, which connects the reaction section 30 to the base 40, or to an element 40' which is rigidly connected to the base 40.

Since, together with the spring element 100, the reaction section 30 forms an oscillation system, a damping member 90 is also provided, in order to damp the oscillation. The resonant-frequency of the system can be set to suitable values by appropriate selection of the spring constants of the spring 100 and the damping constants of the damping element 90, taking account of the mass of the reaction section 30, as was mentioned in the introduction.

Figure 3:
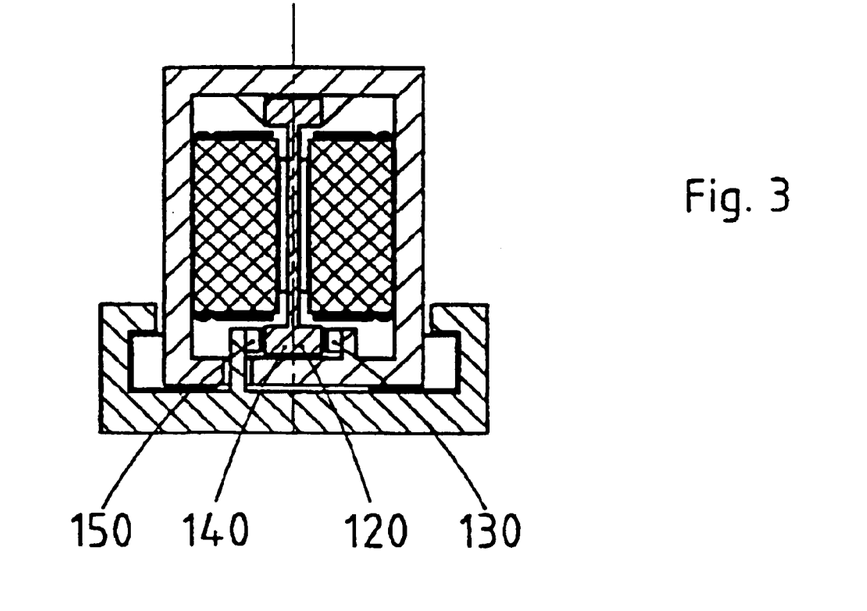
FIG. 3 shows a section view along the line A—A in FIG. 1.

Furthermore, FIG. 1 shows a gauge 120. FIG. 3, in particular, shows that this gauge 120 is fitted together with a further gauge 140 to the output-drive section 20 of the motor 10. The second gauge 140 is used together with a position sensor 150, which is fitted to the base 40, for position measurement of the output-drive section with respect to the base. Data for position control of the output-drive section, and thus of the tool 60, can be derived in a manner known per se from the position measurement signals via the gauge 140, and from the sensor 150.

The output-drive section position data measured using the gauge 140 and the sensor 150 may be used directly for position control, that is to say without there being any need to compensate for the movement of the reaction section 30. Since, furthermore, the reaction section 30 is decoupled from the base, the position measurement data furthermore do not include any superimposition of vibration from the base 40, as occurs in the prior art owing to the transmission of the opposing momentum from the reaction section 30 to the base 40. Simple and accurate position control is thus possible.

The illustrated motor is a three-phase electric motor in which, as was mentioned in the introduction, the motor phase angle of the supply must be related in a fixed manner to the relative position of the motor active surfaces ("commutation"). For this reason, the additional gauge 120 is provided on the output-drive section 20, and interacts with a sensor 130 on the reaction-section, by which means data relating to the relative position between the output-drive section and the reaction section are obtained and are used in a known manner for commutation. It should be stressed here that this additional measurement system 120, 130 is not used to control the operating position of the motor, but only to control the electric power to the motor. In contrast to the situation with known linear motors in which the reaction section is firmly anchored oh the base, so that a signal for the commutation process can be derived from the position of the output-drive section, the position of the reaction section 30 is not fixed in the motor according to the invention so that, in addition, the relative position between the output-drive section 20 and the reaction section 30 must be determined.

In the illustrated exemplary embodiment, two gauges 120 and 140 are provided on the output-drive section 20. However, in principle, it is also possible to provide just one gauge on the output-drive section, in which case both sensors 130 and 150 interact with this single gauge.

Figure 4:
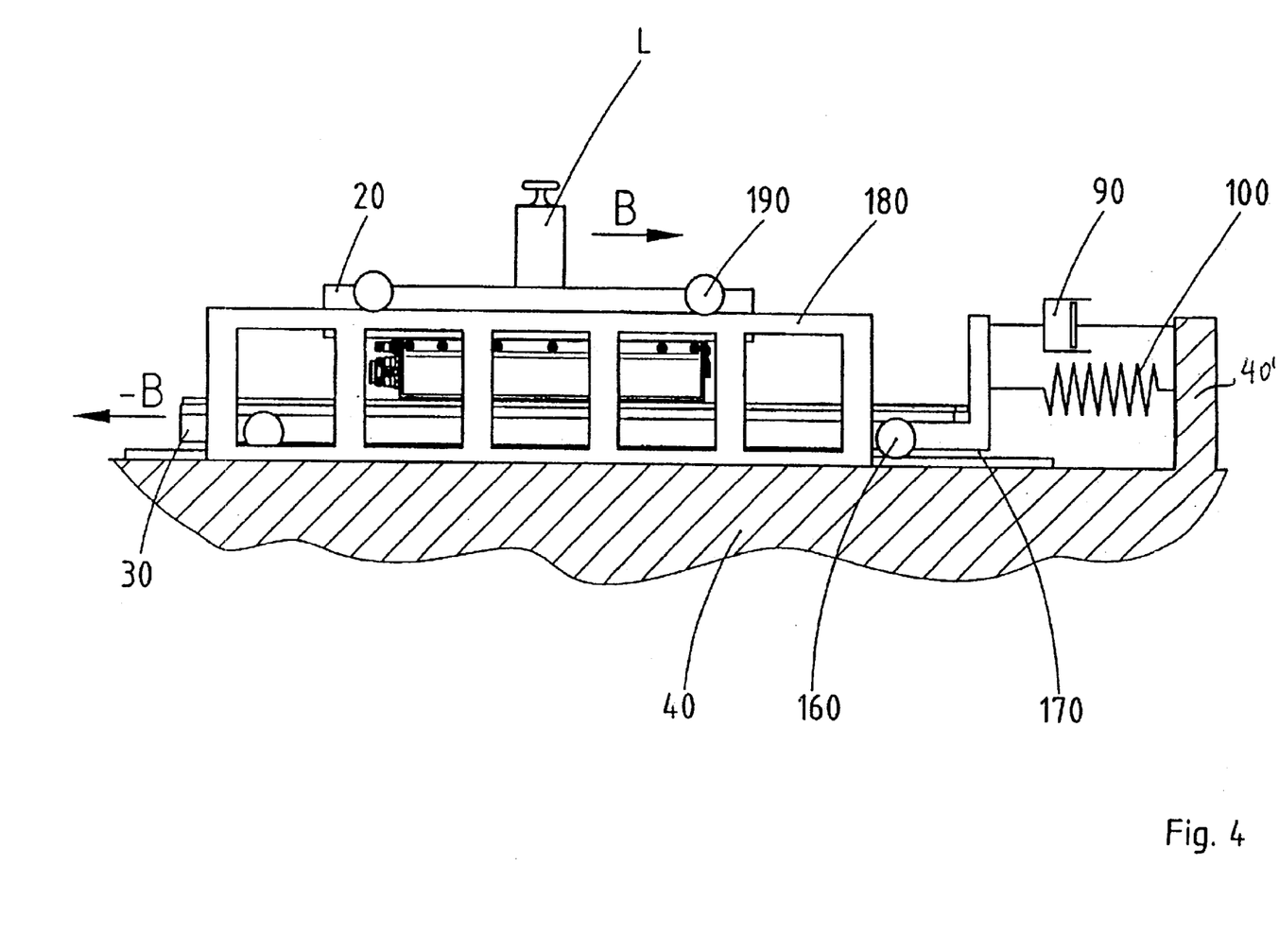
FIG. 4 shows a schematic illustration of a side view of a further motor according to the invention.
Figure 5:
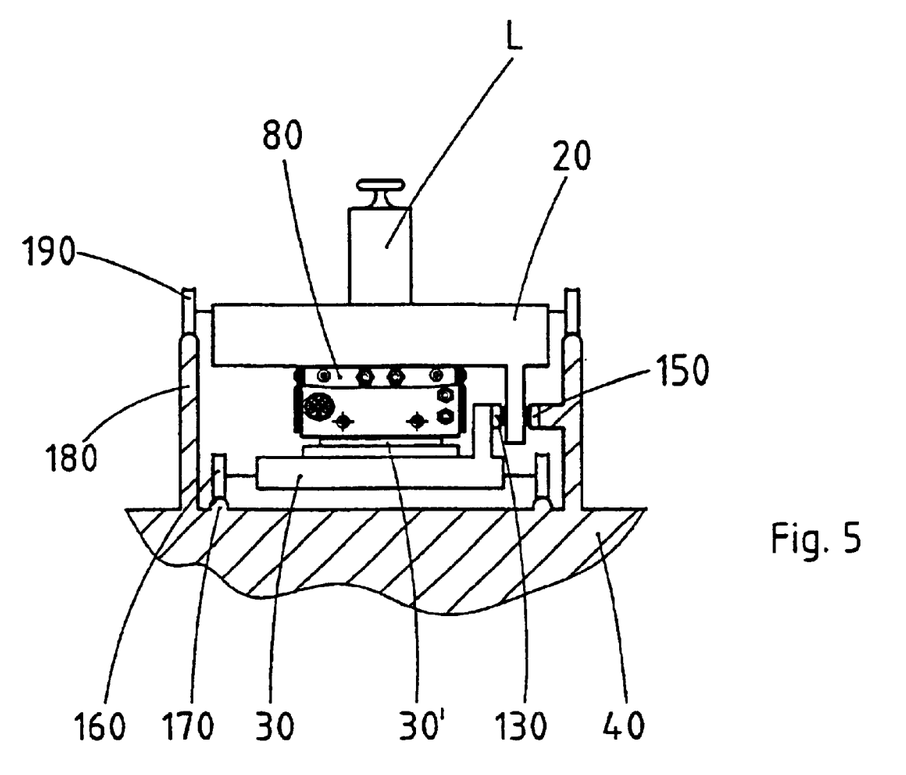
FIG. 5 shows a front view of the motor from FIG. 4, FIGS. 6, 6a, 7, 7a show schematic side views of a motor in order to explain the suspension according to the invention.

FIGS. 4 and 5 show a side view and front view of a further exemplary embodiment of the linear motor according to the invention. In order to illustrate the moving mounting of the reaction section 30 on the base 40, the reaction section 30 in this case is provided with rollers 160, which run on rails 170 on the base 40. In this case, the output-drive section 20 forms the primary section, and the winding unit 80 interacts with the reaction section 30 via a magnet plate 30'. The output-drive section 20 is also provided with rollers 190 which, for their part, run on rails 180 which are firmly connected to the base 40. The reaction section is fitted with a symbolically indicated load L, which may be a workpiece or a tool When the output-drive section 20 moves in the direction of the arrow B in FIG. 4, the reaction section moves in the direction of the arrow-B. The magnitude of the opposing movement depends on the masses of the output-drive section and of the reaction section (momentum conservation). The spring element 100 and a damping member 90 are provided in this exemplary embodiment as well.

Figures 6, 6A:
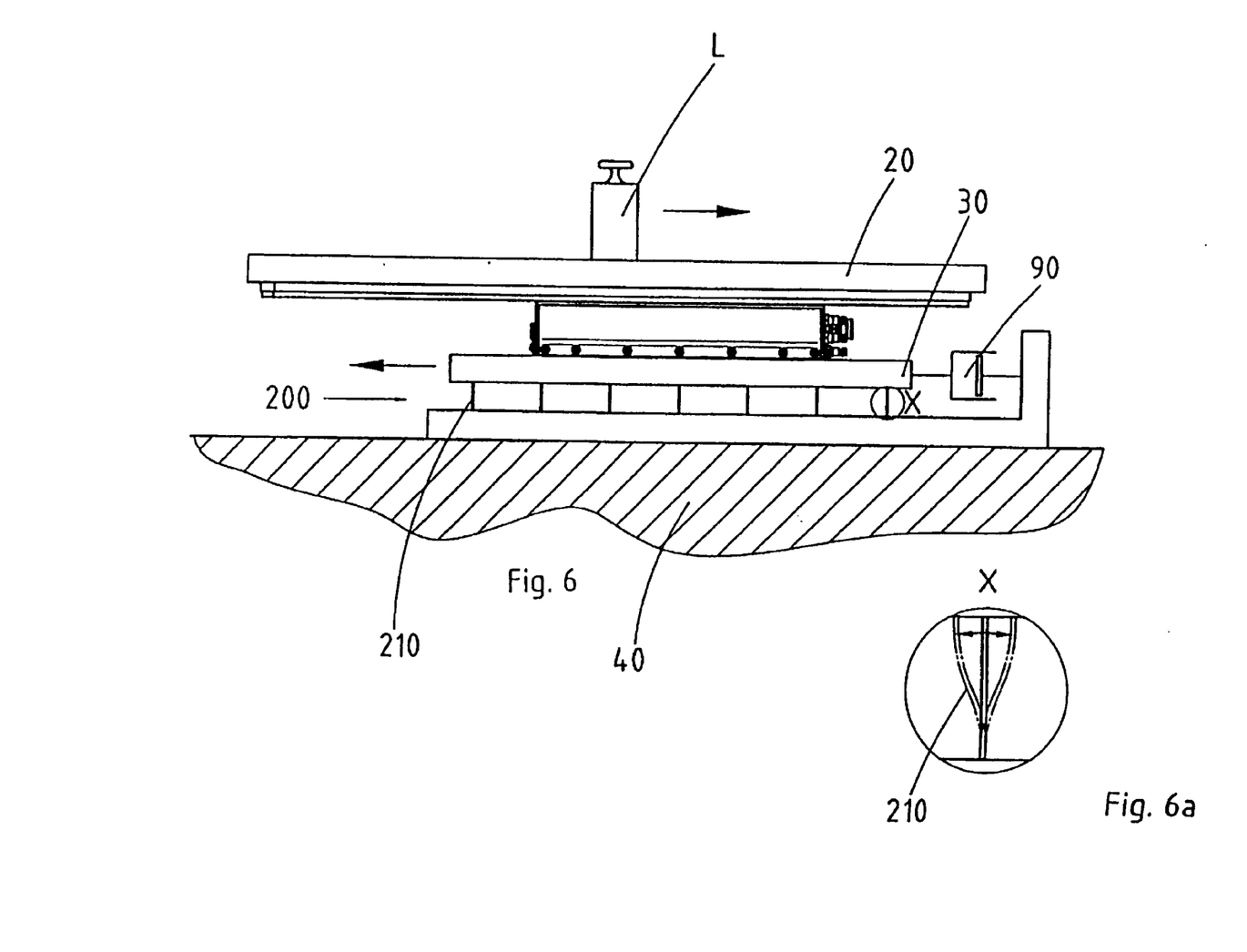
Figures 7, 7A:
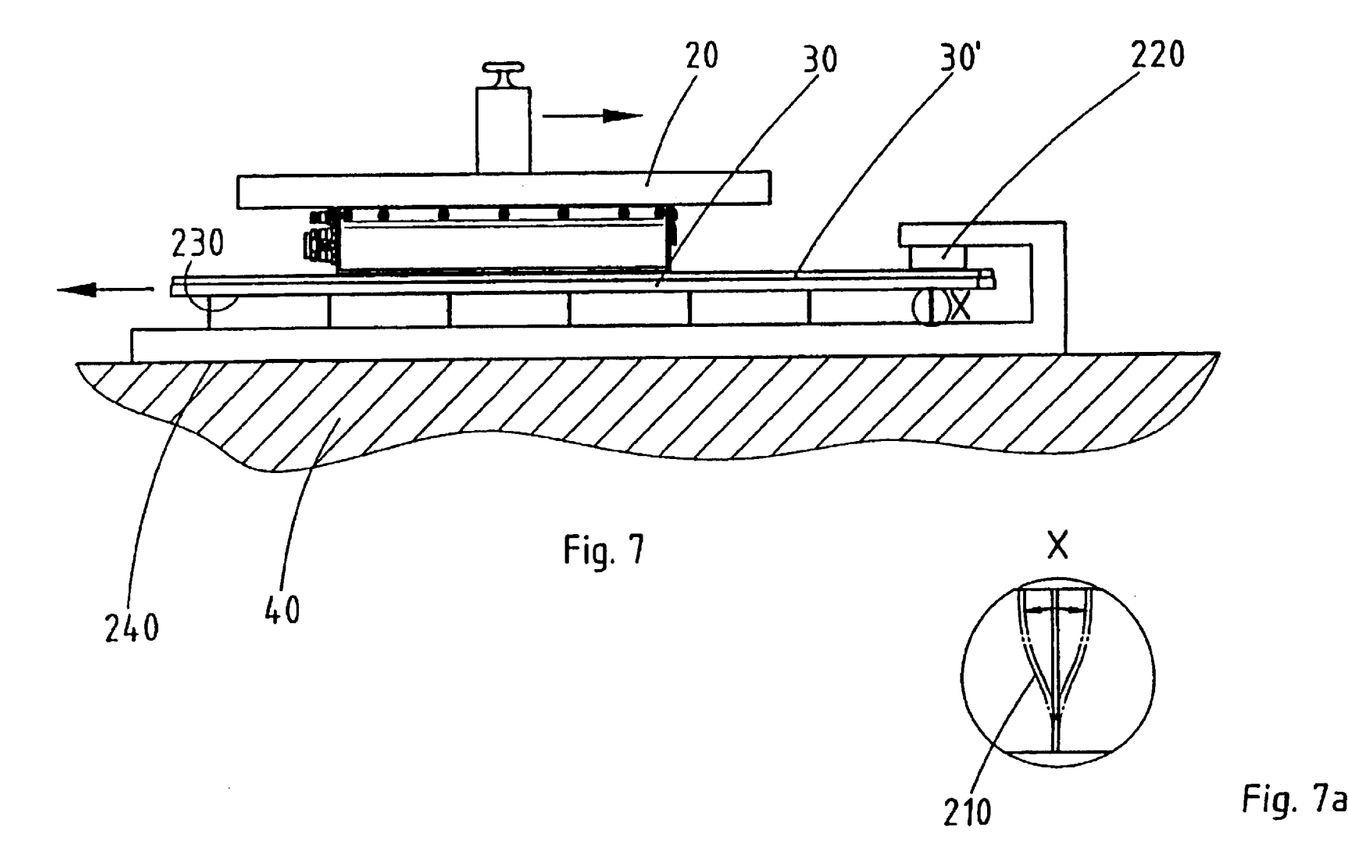

FIGS. 6 and 7 show advantageous refinements of the bearings of the reaction section 30.

FIG. 6 shows a reaction section 30 which is in the form of the primary section and is suspended on a support 200 by means of spring tongues 210. The tongues 210 can provide the required restoring force. In order to extract the resonance energy from the oscillating structure, a damper 90 is fitted in the movement direction. A compact version of such an arrangement may, for example, be offered as a corresponding mounting intermediate plate for the reaction section, or may be integrated directly in the primary section.

FIG. 6a shows the deflections of the spring tongues 210 during operation of the motor, on an enlarged scale.

FIG. 7 shows a reaction section 30 which is in the form of the secondary section and is likewise mounted on the base 40, springably via elastic tongues. In this case, the damping is produced directly on the surface of a magnet plate 30' (secondary section). An appropriate eddy-current element 220 is arranged at the end of the magnet plate 30' of the reaction section 30 for this purpose. The eddy-current element 220 is firmly connected to the base 40 and produces eddy currents during movement of the reaction section. These counteract the movement in proportion to the speed, and thus damp the natural oscillations of the sprung-mounted reaction section 30. This element may also be integrated in the reaction section 30, or may be produced as a mounting adapter.

According to the invention, the bearing apparatus may also be designed as a separate component, in which case a mounting surface 230 is provided for the reaction section 30, and a mounting surface 240 is provided for attachment to a base.

What is claimed is:

1. A drive motor for a machine tool, comprising:
   an output-drive section associated with a useful load;
   a reaction section which interacts with the output-drive section;
   a base for attaching the drive motor to the machine tool;
   a bearing apparatus disposed between the reaction section and the base and supporting the reaction section on the base, which bearing apparatus enables the reaction section to perform an opposing movement to a movement of the output-drive section;
   elastic spring means connected between the base and the reaction section;
   damping means implemented as an electromagnetic damping device and connected in parallel with the elastic spring means; and
   a position sensing device for deriving data for position control of the drive motor,
   wherein the position sensing device determines position data of the output-drive section relative to the base.

2. The drive motor as claimed in claim 1, wherein the position sensing device comprises a gauge which is firmly connected to the output-drive section, and a sensor which is firmly connected to the base.

3. The drive motor as claimed in claim 1, wherein the elastic spring means are integrated in the bearing apparatus.

4. The drive motor as claimed in claim 1, wherein the damping means is integrated in the bearing apparatus.

5. The drive motor as claimed in claim 1, wherein the electromagnetic damping device includes an eddy-current element attached to the base and a magnetic plate formed as a secondary section of the reaction section.

6. The drive motor as claimed in claim 1, wherein the bearing apparatus has a hydrostatic bearing.

7. The drive motor as claimed in claim 1, wherein the bearing apparatus has a roller bearing.

8. The drive motor as claimed in claim 1, wherein the bearing apparatus has a magnetic bearing.

9. The drive motor as claimed in claim 1, wherein the elastic spring means include at least one elastic tongue extending perpendicular to a drive direction of the drive motor between the base and the reaction section.

10. The drive motor as claimed in claim 1, wherein the base is largely decoupled from the momentum produced by the opposing movement of the reaction section.

11. The drive motor as claimed in claim 1, wherein the base absorbs the processing forces transmitted from the output-drive section, and the reaction section absorbs the movement forces transmitted from the output-drive section.

12. The drive motor as claimed in claim 1, wherein a processing force transmitted by the output-drive section to the useful load can be adjusted by means of the elastic spring means.

13. The drive motor as claimed in claim 1, wherein the drive motor is an electric linear motor.

14. The drive motor as claimed in claim 13, wherein the drive motor is a multiphase linear motor and the drive motor includes a second position sensing device that determines second position data of the output-drive section relative to the reaction section.

15. The drive motor as claimed in claim 1, wherein the drive motor is a torque motor.

16. The drive motor as claimed in claim 1, wherein the drive motor is a fluid motor.

17. The drive motor as claimed in claim 1, wherein the electromagnetic damping device and the elastic spring means form a low-pass filter with a cutoff frequency of approximately 5 to 10 Hz.

18. A machine for processing workpieces having a drive motor and a base for attaching the drive motor to the machine, said drive motor comprising:

an output-drive section associated with a useful load;

a reaction section which interacts with the output-drive section;

a bearing disposed between the reaction section and the base, with the reaction section being mounted in the bearing such that a movement of the output-drive section causes the reaction section to perform an opposing movement;

elastic spring means connected between the base and the reaction section;

damping means implemented as an electromagnetic damping device and connected in parallel with the elastic spring means; and a position sensing device which determines position data of the output-drive section relative to the base, with the position data controlling the drive motor, wherein the useful load is a workpiece or a tool.

19. The machine as claimed in claim 18, wherein at least one of the bearing and the base form a part of the machine or are integrated in the machine.

20. The machine as claimed in claim 18, wherein the machine is an eccentric lathe.

21. A pump having a drive motor and a base for attaching the drive motor to the pump, the drive motor including:

an output-drive section associated with a pump piston;

a reaction section which interacts with the output-drive section;

a bearing disposed between the reaction section and the base, and supporting the reaction section on the base, with a movement of the output-drive section causing the reaction section to perform an opposing movement;

elastic spring means connected between the base and the reaction section;

damping means implemented as an electromagnetic damping device and connected in parallel with the elastic spring means; and a position sensing device which determines position data of the output-drive section relative to the base, with the position data controlling the drive motor.

* * * * *